3,156,610
METHOD OF CONTROLLING PESTS WITH AMINO-ALKYL-CARBAMIC ACIDS
John H. Wotiz, Mentor, Ohio, assignor to Diamond Alkali Company, Cleveland, Ohio, a corporation of Delaware
No Drawing. Filed Nov. 17, 1961, Ser. No. 153,191
4 Claims. (Cl. 167—22)

This invention relates to new compositions of matter, and more particularly, to novel compounds represented by the formula:

$$H_2N(R^0)(CH_2)_2[(CH_2)_a(R^1)_b(NH)_c(CH_2)_d\\(R^2)_e(NH)_c(CH_2)_f]_g(R^0)NHCOOH$$

wherein $R^0$ is alkylene; $R^1$ and $R^2$ are selected from the group consisting of alkylene, arylene, aralkylene, oxygen, sulfur, mercury, divalent heterocyclic radicals, divalent metal-containing radicals, and substituted derivatives of the foregoing; $a$ is an integer from 3 to 20, inclusive; $b$ and $e$ are integers from 0 to 2, inclusive; $c$ is an integer from 0 to 1, inclusive; $d$ is an integer from 5 to 42, inclusive; $f$ is an integer from 5 to 22, inclusive; and $g$ is an integer from 1 to 100, inclusive.

More specifically, the novel compounds of this invention may be represented by the following structure:

$$H_2N(CH_2)_m[(R^3)(CH_2)_2(R^4)\\(CH_2)_2]_g(CH_2)_mNHCOOH$$

wherein $R^3$ and $R^4$ are alkylene; $m$ is an integer from 2 to 22, inclusive; and $g$ is as defined hereinabove.

Exemplary of the compounds of this invention is 16-amino-hexadecylcarbamic acid, which has the following structure:

$$H_2N(CH_2)_{16}NHCOOH \rightleftharpoons H_3N^\oplus(CH_2)_{16}NHCOO^\ominus$$

As a general rule, compounds of this invention may be represented as an equilibrium mixture of an electrically neutral species, such as that on the left of the arrow, and a "zwitter-ion" such as that represented on the right of the arrow.

Compounds of this invention may generally be prepared by the reaction of carbon dioxide with a hydrogenated derivative of a linear non-conjugated polyacetylenic alpha, omega-diamine. Amino derivatives of polyyne hydrocarbons are prepared by the reaction of ammonia with a halogen-terminated polyacetylenic compound, as described in co-pending application Ser. No. 54,384, filed September 7, 1960, which application is hereby incorporated into and made a part of this specification.

Hydrogenation of the polyacetylenic amine may be accomplished by reacting the amine with hydrogen in the presence of a catalyst such as paladium oxide or platinum oxide, nickel, e.g., Raney nickel, colloidal paladium or platinum, tungsten oxide, molybdenum oxide, aluminum oxide, thorium oxide, Adams' catalyst ($PtO_2$, Pt), nickel-copper, nickel-alumina, copper-zinc oxide, copper-chromium oxide, or zinc oxide-chromium oxide. The reaction is normally carried out by contacting with hydrogen the desired acetylenic compound and catalyst at pressures ranging from atmospheric to about 2500 p.s.i.g. or higher. The reaction temperature can be varied from about 0° to 200° C., preferably about 25° to 100° C. It is convenient to dissolve the acetylenic reactant in a solvent such as ethanol or other lower alkanol, acetic acid, ethyl acetate, ethyl ether, cyclohexane, dioxane, or the like.

The saturated alpha, omega-diamines prepared by the foregoing procedure are extremely sensitive to atmospheric carbon dioxide. They are slowly converted to the carbamic acid compounds of this invention on standing for extended periods of time in contact with air. However, they may be more conveniently converted into carbamic acids by direct reaction with carbon dioxide in a more concentrated form. Thus, the diamine may be dissolved in a suitable solvent, such as ether, acetone, cyclohexanone, aliphatic or aromatic hydrocarbons or halogenated derivatives thereof, or the like, and the resulting solution may be contacted with carbon dioxide in the vapor state by bubbling carbon dioxide through the solution. Alternatively, the solution may be poured over solid carbon dioxide (Dry Ice).

If desired, the amine may be dissolved in water and the aqueous solution may be contacted with carbon dioxide. However, it is usually more convenient to employ a non-polar solvent since the solid carbamic acid will then precipitate as it is formed.

Illustrative of polyacetylenic diamines which may be used as starting materials for compounds of the present invention are the following:

1,16-diamino-5,11-hexadecadiyne
$$H_2N(CH_2)_4C\equiv C(CH_2)_4C\equiv C(CH_2)_4NH_2$$

1,28-diamino-5,11,17,23-octacosatetrayne
$$H_2N[(CH_2)_4C\equiv C]_4(CH_2)_4NH_2$$

Bis(16-aminohexadeca-5,11-diynyl)amine
$$[H_2N(CH_2)_4C\equiv C(CH_2)_4C\equiv C(CH_2)_4]_2NH$$

The compounds of the invention are useful as chemical intermediates and are also effective as pesticides for controlling fungi, bacteria and other organisms. While it is possible to apply the compounds of the present invention in undiluted form to the plant or other material to be protected, it is frequently desirable to apply them in admixture with either solid or liquid inert, pesticidal adjuvants. Thus, they can be applied to the plants for fungicidal purposes, for example, by spraying them with aqueous or organic solvent dispersions of the compound. The choice of an appropriate solvent is determined largely by the concentration of active ingredient which it is desired to employ, by the volatility required in a solvent, the cost of the solvent and the nature of the material being treated. Among the many suitable organic solvents which can be employed as carriers for the present pesticides, there may be mentioned hydrocarbons such as benzene, toluene, xylene, kerosene, diesel oil, fuel oil, petroleum, naphtha, ketones such as acetone, methyl ethyl ketone and cyclohexanone, chlorinated hydrocarbons, such as carbon tetrachloride, chloroform, trichloroethylene, perchloroethylene, esters such as ethyl acetate, amyl acetate and butyl acetate, the monoalkyl ethers of ethylene glycol, e.g., the monomethyl ether, the monoalkyl ethers of diethylene glycol, e.g., the monoethyl ether, alcohols such as ethanol, isopropanol and amyl alcohol, etc.

The compounds of this invention can also be applied to plants and other materials along with inert solid fungicidal adjuvants or carriers such as talc, pyrophyllite, Attaclay, kieselguhr, chalk, diatomaceous earth, lime, calcium carbonate, bentonite, fuller's earth, cottonseed hulls, wheat flour, soybean flour, etc., pumice, tripoli, wood flour, walnut shell flour and lignin.

It is frequently desirable to incorporate a surface active agent in the pesticidal compositions of this invention. Such surface active agents are advantageously employed in both the solid and liquid compositions. The surface active agent can be anionic, cationic or nonionic in character.

Typical classes of surface active agents include alkyl sulfonates, alkylaryl sulfonates, alkyl sulfates, alkylamide sulfonates, alkylaryl polyether alcohols, fatty acid esters of polyhydric alcohols, ethylene oxide addition products of such esters; addition products of long chain mercaptans and ethylene oxide; sodium alkyl benzene sulfonates having 14 to 18 carbon atoms, alkylphenolethylene oxides, e.g., p-isooctyl phenol condensed with 10 ethylene oxide units; soaps, e.g., sodium stearate and sodium oleate; and certain quaternary ammonium salts.

The solid and liquid formulations can be prepared in any suitable method. Thus, the active ingredients, in finely divided form if a solid, may be tumbled together with finely divided solid carrier. Alternatively, the active ingredient in liquid form, including solutions, dispersions, emulsions and suspensions thereof, may be admixed with the solid carrier in finely divided form in amounts small enough to preserve the free-flowing property of the final dust composition.

When solid compositions are employed, in order to obtain a high degree of coverage with a minimum dosage of the formulation, it is desirable that the formulation be in finely divided form. The dust containing active ingredient usually should be sufficiently fine that substantially all will pass through a 20-mesh Tyler sieve. A dust which passes through a 200-mesh Tyler sieve also is satisfactory.

For dusting purposes, preferably formulations are employed in which the active ingredient is present in an amount of 5% to 50% of the total by weight. However, concentrations outside this range are operative and compositions containing from 1% to 99% of active ingredient by weight are contemplated, the remainder being carrier and/or any other additive or adjuvant material which may be desired. It is often advantageous to add small percentages of surface active agents, e.g., 0.5% to 1% of the total composition by weight, to dust formulations, such as the surface active agents previously set forth.

For spray application, the active ingredient may be dissolved or dispersed in a liquid carrier, such as water or other suitable liquid. The active ingredient can be in the form of a solution, suspension, dispersion or emulsion in aqueous or non-aqueous medium. Desirably, 0.5% to 1.0% of a surface active agent by weight is included in the liquid composition.

For adjuvant purposes, any desired quantity of surface active agent may be employed, such as up to 250% of the active ingredient by weight. If the surface active agent is used only to impart wetting qualities, for example, to the spray solution, as little as 0.05% by weight or less of the spray solution need be employed. The use of larger amounts of surface active agent is not based upon wetting properties but is a function of the physiological behavior of the surface active agent. These considerations are particularly applicable in the case of the treatment of plants. In liquid formulations the active ingredient often constitutes not over 30% by weight of the total and may be 10%, or even as low as 0.01%.

The novel compounds of the present invention can be employed in compositions containing other pesticides, more especially fungicides, insecticides, herbicides, nematocides and bactericides, e.g., phenothiazine, pyrethrum, rotenone, DDT, dimethyl tetrachloroterephthalate, etc.

The following examples are given in order that those skilled in the art may more completely understand the invention and the preferred methods by which the same may be carried into effect.

EXAMPLE I

*Preparation of 1,16-Diamino-5,11-Hexadecadiyne*

A five-gallon autoclave, equipped with an agitator and temperature control means, is charged with 2.5 gallons of liquid ammonia. Sodium amide, 312 g. (8 moles) is added to the ammonia and 424 g. (4 moles) of 1,7-octadiyne is then added slowly. The temperature of the reaction mixture is maintained at −33° C. The reaction mixture is stirred for one hour in order to convert all of the 1,7-octadiyne to its disodium salt; then 1728 g. (8 moles) of 1,4-dibromobutane is added slowly at −50° to −55° C. The temperature is raised to and maintained at −40° to −33° C. for two hours after the addition of the 1,4-dibromobutane has been completed. The autoclave is then sealed and the temperature is kept near 50° C., resulting in an ammonia pressure of about 400 p.s.i.g. This temperature and pressure are maintained for two hours. The contents of the autoclave are allowed to cool overnight, the ammonia is vented and the residue is treated with water. The mixture separates into two layers and the organic layer (about 1 kilogram) is diluted with two liters of ethyl ether and washed with three one-liter portions of a 10% aqueous sodium hydroxide solution. The ether solution is finally dried over anhydrous sodium sulfate.

The dried ether solution of the diamine is filtered and diluted with 5 liters of ethyl ether. The solution is stirred in a 10-liter flask equipped with a condenser, and dry carbon dioxide is passed into the solution. A solid immediately precipitates from the solution. After the $CO_2$ treatment has continued for ½ hour, the solid is removed by filtration and treated with a ten-fold volume of 10% aqueous sodium hydroxide solution at 70° C. The organic layer which separates, comprising the alpha, omega-polyacetylenic diamines formed in the reaction, is distilled under reduced pressure. The desired 1,16-diamino-5,11-hexadecadiyne ($C_{16}H_{28}N_2$) boils at 152° C. at a pressure of 0.05 mm. Hg. The structure is supported by the following analytical data:

| Element | Actual Percent by Weight | Calculated Percent by Weight |
|---|---|---|
| C | 78.1 | 77.4 |
| H | 10.9 | 11.3 |
| N | 10.7 | 11.3 |
| Molecular weight | 239 | 248 |

Infrared spectra also confirm the assigned structure. The compound is very sensitive to carbon dioxide and becomes cloudy upon exposure to air.

EXAMPLE II

*1,16-Diaminohexadecane*

PART A

To a solution of 27.7 g. (0.166 mole) of 1,16-diamino-5,11-hexadecadiyne in 300 ml. of ethyl acetate is added 0.2 g. of platinum oxide (Adams' catalyst). The material is hydrogenated in a Parr hydrogenation apparatus at an initial pressure of 61 p.s.i.g. The theoretical amount of hydrogen is consumed within two hours. The crude product is recovered by filtration and evaporation of the solvent and is recrystallized from ether. The yield is 23.5 g. (82% of the theoretical amount) of 1,16-diamino-5,11-hexadecane ($C_{16}H_{36}N_2$), M.P. 80° to 81° C. The compound is extremely sensitive to carbon dioxide and must be protected from exposure to air. The analytical results given below, as well as the infrared spectra, support the proposed structure.

| Element | Actual Percent by Weight | Calculated Percent by Weight |
|---|---|---|
| C | 74.7 | 75.1 |
| H | 13.9 | 14.0 |
| N | 11.5 | 10.9 |

*Preparation of 16-Aminohexadecylcarbamic Acid*

PART B

The 1,16-diaminohexadecane prepared in Part A is dissolved in ether and carbon dioxide is bubbled through the ether solution until the precipitation of solid product ceases. The product is filtered and washed with ether. There is obtained 26.9 g. (100% of the theoretical amount) of 16-aminohexadecylcarbamic acid ($C_{17}H_{36}N_2O_2$), M.P. 137° to 140° C. Infrared spectral data and the following analytical results support the proposed structure:

| Element | Actual Percent by Weight | Calculated Percent by Weight |
|---|---|---|
| C | 68.9 | 68.0 |
| H | 11.7 | 12.0 |
| N | 9.8 | 9.3 |

EXAMPLE III

Fungicidal Activity—Foliage Protectant Tests

The following test measures the ability of the test compound to protect tomato foliage against infection by the early blight fungus *Alternaria solani* and the late blight fungus *Phytophthora infestans*. Results from this test indicate whether a compound may have practical use as a foliage protectant fungicide.

Duplicate tomato plants (var. Bonny Best, 5 to 7 inches high and four to six weeks old), one set for each test fungus, are sprayed with 100 ml. of the test formulation (stated concentration of test compound, 4% acetone, 0.01% Triton X-155, balance water) at 40 lbs. air pressure while being rotated on a turntable in a hood. The center of the turntable is 45 inches from the nozzle of the spray gun.

After the spray deposit is dry, treated plants and controls (sprayed with formulation less toxicant) are sprayed while being rotated on a turntable with a spore suspension containing approximately 2000 conidia of *A. solani* per ml., or 15,000 sporangia of *P. infestans* per ml. The atomizer used delivers 20 ml. in the 30-second exposure period. The plants are held for 24 hours in an atmosphere saturated with water vapor at 70° F. for early blight and 60° F. for late blight to permit spore germination and infection before removal to the greenhouse.

After two days from the start of the test for early blight and three days for late blight, lesion counts are made on the three uppermost fully expanded leaves. The data are converted to percentage disease control based on the number of lesions obtained on the control plants.

When tested by this procedure, 16-aminohexadecylcarbamic acid gives 97% control of early blight and 100% control of late blight at a concentration of 128 p.p.m.

EXAMPLE IV

Bactericidal Activity

The following test measures the ability of the test compound to inhibit the growth of three bacterial species, *Erwinia amylovora*, *Xanthomonas phaseoli* and *Staphylococcus aureus*. The bacterial species are cultured on nutrient agar slants except *X. phaseoli* which is grown on potato dextrose agar.

The cultures used for tests are sub-cultured for two sequential twenty-four hour periods to insure uniform test populations. Bacterial suspensions are made from the second sub-culture in the culture tube by addition of distilled water and gentle agitation after which they are filtered through double layers of cheesecloth and digested to standard concentrations by turbidimetric measurement. Each of three test tubes arranged in a rack receive one ml. of the test formulation. (The basic test formulation contains 1250 p.p.m. of the test compound, 5% acetone, 0.0125% Triton X-155, balance water; this formulation is diluted to provide the concentrations specified.) After the test formulations have been measured into a test tube, 3½ ml. of distilled water and ½ ml. of bacterial suspension for each respective test organism is added to each test tube. The medication tubes are then set aside at room temperature for 4 hours. After this exposure period, transfers are made by means of a standard 4 mm. platinum loop to 7 ml. of sterile broth in test tubes arranged in racks similar to those for the medication tubes. The broth tubes are then incubated for 48 hours at 29° to 31° C., at which time growth is measured by use of a Bausch & Lomb spectronic "20" direct reading colorimeter. A reading is recorded for each test tube after shaking. Usually three replicates of each organism serve as controls. Calculations are made on percent of the mean check readings. This figure subtracted from 100 gives percent control as compared to checks.

When tested by this method, 16-aminohexadecylcarbamic acid at a concentration of 100 p.p.m. gives 100% control of each of the three bacterial species.

It is to be understood that although the invention has been described with specific reference to particular embodiments thereof, it is not to be so limited, since changes and alterations therein may be made which are within the full intended scope of this invention as defined by the appended claims.

What is claimed is:

1. The method of destroying pests which comprises contacting said pests with an active amount of 16-aminohexadecylcarbamic acid.

2. The method of destroying fungus growths which comprises contacting said fungus with an active amount of 16-aminohexadecylcarbamic acid.

3. The method of killing bacteria which comprises contacting said bacteria with an active amount of 16-aminohexadecylcarbamic acid.

4. The method of destroying pests which comprises contacting said pests with an active amount of a compound of the structure $$H_2N(CH_2)_m[(R^3)(CH_2)_2(R^4)(CH_2)_2]_g$$
$$(CH_2)_mNHCOOH$$

wherein $R^3$ and $R^4$ are alkylene, $m$ is an integer from 2 to 22, inclusive, and $g$ is an integer from 1 to 100, inclusive.

References Cited in the file of this patent

UNITED STATES PATENTS

| | | |
|---|---|---|
| 2,717,850 | Schmitz | Sept. 13, 1955 |
| 2,723,973 | Herrick et al. | Nov. 15, 1955 |
| 2,906,776 | Doser | Sept. 29, 1959 |
| 2,959,614 | McCord | Nov. 8, 1960 |
| 2,990,318 | Jones et al. | June 27, 1961 |
| 2,990,319 | Jones et al. | June 27, 1961 |

FOREIGN PATENTS

| | | |
|---|---|---|
| 850,003 | Germany | Sept. 22, 1952 |

OTHER REFERENCES

Klopping et al.: "Organic Fungicides. Rec. Trav. Chim.," vol. 70 1951), 949, cited in Thron et al., "The Dithiocarbamates and Related Compounds," Elsevier Pub. Co., New York, 1962, pp. 21 and 40.

Filberman: Chemical Abstracts, vol. 50, p. 4776 (1956).